April 20, 1965      R. O'REGAN      3,178,934
METHODS AND APPARATUS FOR PHOTOELASTIC STRAIN
ANALYSIS OF STRUCTURAL MEMBERS
Filed July 18, 1963      3 Sheets-Sheet 1
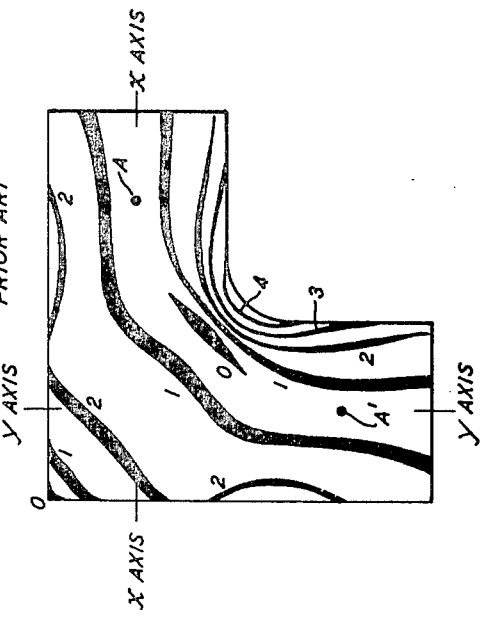
FIG. 4
PRIOR ART
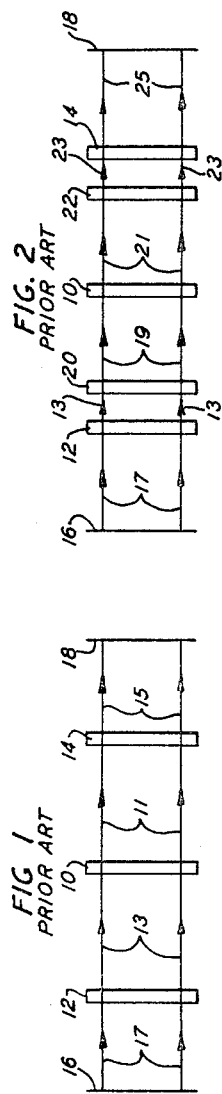
FIG. 2
PRIOR ART
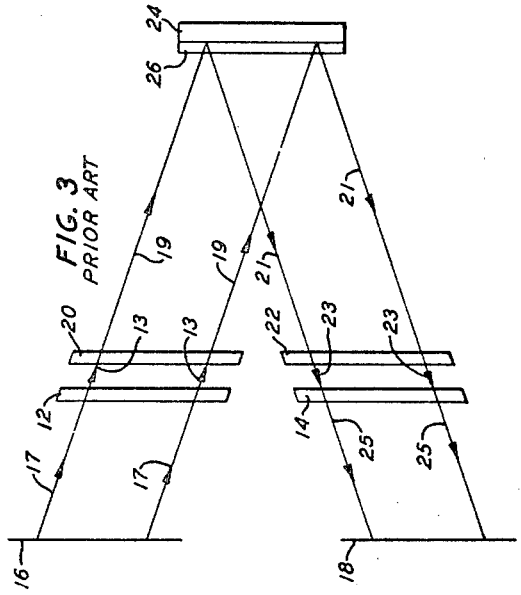
FIG. 3
PRIOR ART
FIG. 1
PRIOR ART
INVENTOR
R. O'REGAN
BY
H. O. Wright
ATTORNEY April 20, 1965  R. O'REGAN  3,178,934
METHODS AND APPARATUS FOR PHOTOELASTIC STRAIN
ANALYSIS OF STRUCTURAL MEMBERS
Filed July 18, 1963  3 Sheets-Sheet 3

3,178,934
METHODS AND APPARATUS FOR PHOTOELASTIC STRAIN ANALYSIS OF STRUCTURAL MEMBERS

Richard O'Regan, Berkeley Heights, N.J., assignor to Bell Telephone Laboratories, Incorporated, New York, N.Y., a corporation of New York
Filed July 18, 1963, Ser. No. 296,005
7 Claims. (Cl. 73—88)

This invention relates to methods and arrangements for observing and analyzing stress and strain distributions and determining stresses and strains in or on the surfaces of structural members. More particularly, it relates to methods and arrangements of the above-mentioned character which employ polarized light passed through a member or coating of photoelastic stress-sensitive or strain-sensitive material which is being subjected to the stress or strain distribution to be analyzed.

As is well known to those skilled in the art, "Hooke's Law" states that strain is proportional to stress. Strain is the ratio of the elongation for tension (or the contraction for compression) to the unstressed length. Stress is the force acting on a given area divided by the area. "Young's Modulus" is the ratio of stress to strain. It is presumed in these relations that the material is not being stressed beyond its elastic limit. Examples of converting stress information to strain information and vice versa will be found hereinunder.

Photoelastic stress-sensitive or strain-sensitive material is material which becomes birefringent to light when stressed or strained, the degree of birefringence being proportional to the stress or strain. Patterns indicative of the distribution of strain and/or stress differences and their directions over the surface of a member or within the member may be formed on a screen by "analyzing" the polarized light emerging from the photoelastic material.

For several decades those skilled in the art have either constructed members of photoelastic strain-sensitive material simulating a structural member the strain distribution in which is to be determined or, alternatively, have firmly cemented coatings of a prescribed uniform thickness of a photoelastic strain-sensitive material to the surfaces of opaque structural members over areas of the surfaces of the members throughout which the surface strains of the members are to be determined.

When an opaque member is to be analyzed, the coating is applied and firmly cemented to the surface of the member while it is in an unstressed state. The member is thereafter subjected to prescribed stresses. Polarized light is then passed through the coating and reflected from the surface of the member being tested (or alternatively, if the surface of the member itself does not adequately reflect light, from a thin reflecting coating resting directly against the surface of the member and firmly attached thereto). An interference pattern of isochromatic fringes and isoclinic lines resulting from the birefringent properties of the photoelastic coating when stressed may then be observed on a suitably disposed screen following passage of the light through a second polarizing member commonly known as an analyzer, which pattern is directly related at each point on the surface to the difference between "principal strains" (or stresses) and their orientations in the plane of the surface. "Principal stresses" are defined, for example, at page 15, paragraph 3, in the book by G. H. Lee, mentioned hereinbelow. It should be noted that the principal stresses are orthogonally related, that is, they are mutually perpendicular to each other. For reasons which will presently become apparent, the abovedescribed type of pattern of isochromatic fringes will be referred to as an "omnidirectional" pattern in this application and in the appended claims.

Obviously, members whose surfaces are under simple uniform tension or compression will not require the use of such refined techniques so that the latter and the improved methods and arrangements of the present invention are intended for use with members which are to be subjected to prescribed forces which produce strains having wide variations in amplitude and direction over the surface which is to be analyzed.

Among numerous publications describing the prior art so-called "photostress" techniques are, by way of examples, an article entitled "A Review of the Photoelastic Method of Stress Analysis" by Raymond D. Mindlin, Journal of Applied Physics, 1939, Volume 10, pages 282 through 294, and the following articles in the magazine "Product Engineering" by F. Zandman, M. R. Wood and others. Specific articles of interest in "Product Engineering" include "Photostress, a New Technique for Photoelastic Stress Analysis for Observing and Measuring Surface Strains on Actual Structures and Parts" in the September 1956 issue at page 167; "Make Strain Visible with Photostress Analysis" in the March 2, 1959 issue at page 43; and "More on Photostress" in the June 8, 1959 issue at page 79.

Numerous books have also been published disclosing the principles and practice of "photostress" strain or stress analysis by use of polarized light and strain-sensitive photoelastic material as employed in the prior art. By way of examples, see the books entitled "An Introduction to Experimental Stress Analysis" by G. H. Lee, published by John Wiley & Sons, Inc., New York 1950, Chapters 6 and 7; "Photoelasticity," two volumes, by M. M. Frocht, also published by John Wiley & Sons, Inc., New York 1949 (third printing), and "Theory of Elasticity" by S. Timoshenko and J. N. Goodier, Chapter 5, pages 131 to 145, published by McGraw-Hill Book Company, New York, 1951.

To determine the principal stresses uniquely, rather than merely their differences as indicated on the abovementioned prior art omnidirectional isochromatic fringe patterns for the majority of points on the surface the prior art, as described for example in the abovementioned publications, usually teaches resorting to either the "shear difference method" or the "oblique incidence method."

Both of these prior art methods involve the difficulties that the stresses must be determined by a tedious point by point analysis of the surface. The operations involved must furthermore be repeated many times in order that information sufficient to permit the mapping of the overall state of stresss over the surface may be obtained. As a result these methods are both time consuming and costly. Furthermore, in the case of the "shear difference method" the normal unavoidable discrepancies involved in carrying out each step of the multistep method are likely to be cumulative so that much of the information obtained may be grossly in error.

In accordance with the present invention two alternative methods, procedures and arrangements are disclosed.

In a first method and arrangement of this invention the surface of the object to be processed is first coated with a standard uniform continuous stress-sensitive photoelastic coating, substantially as for the prior art methods mentioned above, and the usual omnidirectional fringe patterns relating to the difference between the principal stresses at each point and the isoclinic lines through the points to be included in the analysis are obtained and recorded, usually by photographing them.

The original coating is then removed and a second stress-sensitive photoelastic coating is applied to the surface. This second coating is in the form of a mat or matrix made up of elongated, parallel, narrow strips of the stress-sensitive photoelastic material which may, for example, be held together by being mounted on a thin film of resin having negligible optical or photoelastic stress effects, to form a substantially continuous surface, except that a small space is left between each strip and the next adjacent strips to it in the mat or matrix. The strips are of rectangular cross section, the thickness dimension, that is, the dimension in the direction perpendicular to the face of the mat or matrix, being determined by the prescribed photoelastic properties desired, substantially as for a continuous coating, as described in the publications mentioned above. The width dimension, that is, the dimension transverse to the length of each strip and parallel to the face of the mat or matrix, is, however, made as small as practical considerations permit so that while the strips are amply sensitive to strain components directed along their longitudinal axes they are substantially insensitive to strain components directed normal to (that is, perpendicular to) the said axes. In typical sensitivity tests the transverse sensitivity of the strips has been found to be less than one and one-half percent of the sensitivity in the direction of the axes of the strips. This produces smaller effects than the normal experimental variations usually to be expected in the results obtained by prior art "photostress" methods.

The second or strip-type coating provides an additional fringe pattern which because of the highly directive sensitivity of the strips provides information concerning components of the principal strains which are directed parallel to the longitudinal axes of the strips. Conversely, the fringe pattern is substantially independent of components of the principal strains which are directed at right angles to said axes, as will be explained in more detail hereinunder. In other words, the strip-type mats or matrices of the invention have highly directive, unidirectional sensitivities to components of strain directed parallel to the length of the strips of which they are composed but are substantially unaffected by components of strain at right angles to the length of the strips. Accordingly, such coatings and the fringe patterns obtained by their use will be characterized in the present application as "unidirectional."

The combined information obtained from the two coatings together with information relative to the directions of the principal strains at each point obtainable from "isoclinic" line patterns (obtained in a manner well known to and extensively used by those skilled in the art and described in detail, for example, in several of the above-mentioned publications) makes relatively simple the determination of the unique strains for all points of the surface to which the coatings are applied as will become apparent from a specific illustrative example given hereinunder of the determination of the strains at a specific point on the surface of a specific structural member by this method.

This new method of the invention completely eliminates the necessity of resorting to either the "shear difference" or the "oblique incidence" methods of the prior art mentioned hereinabove and consequently very substantially reduces the time and effort required for making a complete analysis of the unique strains at each point of interest on the surface. An appreciable increase in the accuracy of the results is also realized.

Alternatively, if the configuration and stress, or strain, distribution of a member to be analyzed are such that, for example, opposite sides or several like surfaces of the member to be tested are substantially identical and are stressed in substantially identical manners, as will be the case, for example, for many members of symmetrical configuration under symmetrically distributed forces, the two above-mentioned coatings may be simultaneously applied one to each of such correspondingly opposite sides or similarly stressed surfaces of the members, respectively. The specific illustrative embodiment discussed in detail hereinbelow is an example of a symmetrical member presenting four surfaces having substantially identical configurations and stress or strain distributions.

In accordance with a second method and arrangement of the present invention, three separate coatings are, in turn, applied to the surface (or two or three of the coatings may be applied simultaneously if two or three surfaces, respectively, exist on the member which are of substantially identical contour and are subjected to substantially identical strains or stresses). In this second method all three coatings are of the mat or matrix of elongated narrow strip-type, as described in detail above.

In accordance with one specific application of this second method of the invention, two of the coatings are applied to their respective surfaces (or applied in succession to a single surface if only one suitable surface is available) in such manner that the direction in which the longitudinal axes of the strips of one coating are applied is at right angles to the direction in which the longitudinal axes of the strips of the other coating are applied. The third coating is then applied so that the longitudinal axes of its strips make an angle of 45 degrees with respect to the directions in which the longitudinal axes of the strips of both of the previously mentioned two coatings are applied. In each instance the coating is applied to the surface while it is in an unstressed condition, the prescribed stresses are imposed on the member and the resulting pattern of isochromatic fringes is observed and recorded, usually by photographing it. No isoclinic lines need be obtained in practicing this second method.

The above arrangement of the three coatings, as will presently become apparent, has aspects reminiscent of the "rosette" arrangements of prior art simple strain gauges though the latter, of course, do not cover any extensive area of the surface being analyzed but are concerned essentially with the strain at a single point.

As for the strain gauge rosettes, the combinations of three strip-type coatings of the invention can, obviously, have other relative angular relations than those described hereinabove, such, for example, as are described for rosettes in the above-mentioned book by G. H. Lee, chapter 2, and particularly several which are illustrated in FIG. 2.3 at page 54.

As will become more readily apparent from the specific illustrative examples explained in detail hereinunder, the two methods and various arrangements of the invention substantially reduce the time and effort required to determine the respective unique strains for a sufficiently large number of points of a surface that mapping of substantially the complete state of stress or strain over the surface may be readily effected. An appreciable increase in accuracy over prior art methods is also usually realized.

Accordingly, a principal object of the invention is to facilitate the determination of the strains and/or stresses at a large number of points (or in the ultimate at all points) on a surface area of a structural member which is to be subjected to prescribed forces which produce strains having wide variations in amplitude and direction over the surface area.

A further object is to reduce the time and effort required to determine the strain and/or stress at a large number of points on a stressed surface of the above-mentioned type.

A still further object is to increase the facility and accuracy with which stress or strain analyses can be made by the use of stress or strain-sensitive coatings of photo-elastic material.

Other and further objects, features and advantages of the invention will become apparent during the course of the detailed description and exposition of specific illustrative arrangements of the invention taken in conjunction with the appended drawing, in which:

FIG. 1 illustrates in diagrammatic form the essential components of a plane polariscope for use with a transparent test member and is employed in explaining elementary basic principles employed in the practice of the present invention;

FIG. 2 illustrates in diagrammatic form the essential components of a circular polariscope for use with a transparent test member and is also employed in explaining further elementary basic principles employed in the practice of the present invention;

FIG. 3 illustrates in diagrammatic form the essential components of a circular polariscope for use with an opaque test member and is employed in explaining still further elementary basic principles employed in the practice of the present invention;

Figure 5:
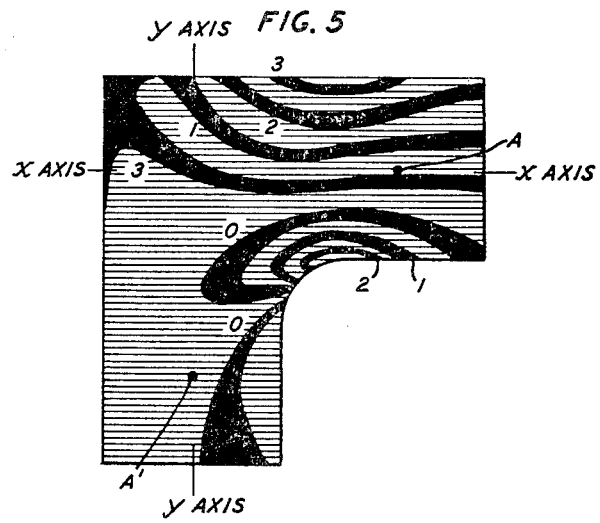
Figure 6:
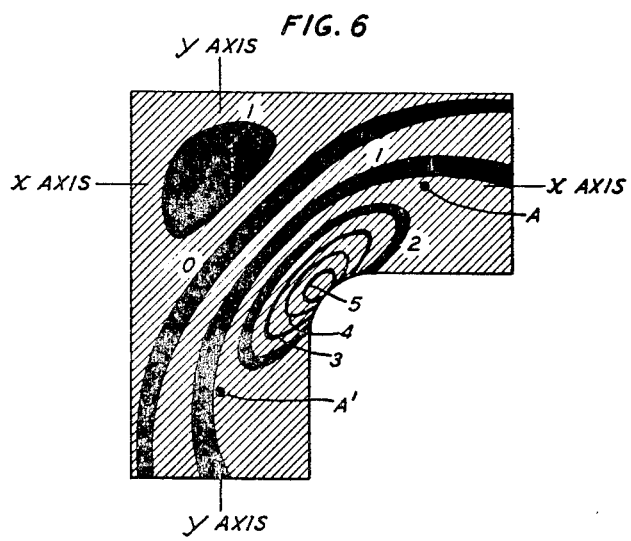
Figure 7:
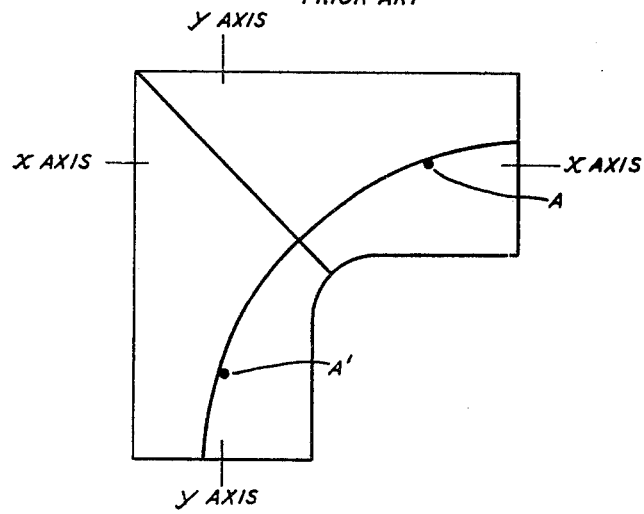
Figure 8:
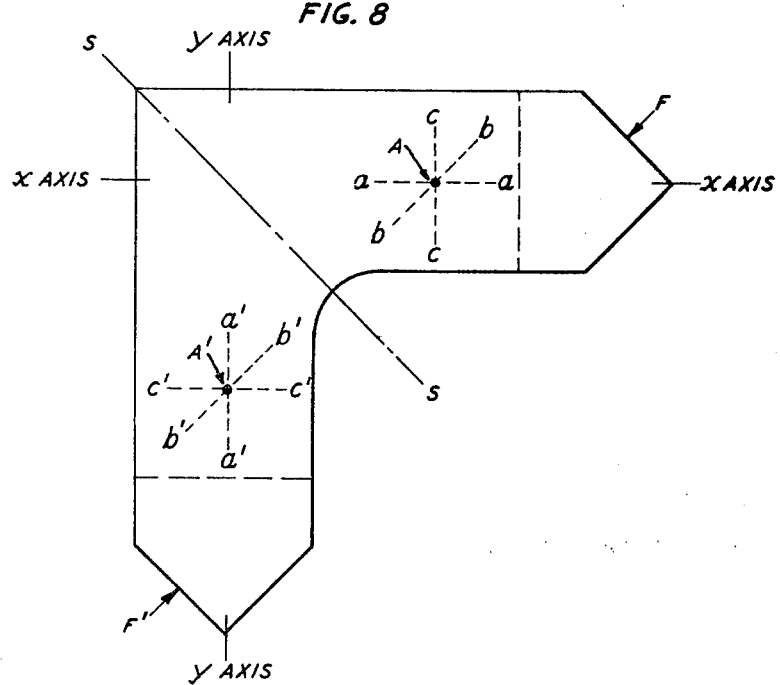

FIG. 4 illustrates an omnidirectional isochromatic fringe pattern obtained with a continuous coating of stress-sensitive photoelastic material as taught in the prior art, the test member being a V-shaped member having its two equal arms mutually perpendicular to each other, the test member being symmetrical about its vertical center line and being symmetrically stressed with respect to said center line;

FIG. 5 illustrates a unidirectional isochromatic fringe pattern obtained with a parallel-strip-type coating of stress-sensitive photoelastic material of the present invention on corresponding portions of both arms of the test member of FIG. 4, the strips on one arm of the member being parallel to the longitudinal axis of the arm, the strips on the other arm being at right angles to the longitudinal axis of the arm;

FIG. 6 illustrates a unidirectional isochromatic fringe pattern obtained with a parallel-strip-type coating of stress-sensitive photoelastic material of the present invention on the corresponding portions of both arms of the test member of FIGS. 4 and 5, the strips being at an angle of 45 degrees with respect to the longitudinal axes of both arms;

FIG. 7 illustrates an isoclinic line pattern obtained with a continuous coating of photoelastic stress-sensitive material on the test member of FIGS. 4, 5 and 6 as taught in the prior art, the "angle" of the isoclinic pattern being the same as that of the axis of symmetry, S—S, of the test member; and FIG. 8 is a diagrammatic showing employed in illustrating the use of information from several patterns to obtain the unique individual principal stress or strain values at a selected point on the test member.

In more detail in the diagrammatic showing of FIG. 1, line 16 represents a source of a beam of parallel rays of monochromatic light (unpolarized) indicated by arrowed lines 17. Rectangle 12 represents a polarizing member, such as a Nicol prism or a Polaroid plate, which passes only that portion of the light beam which is polarized in a particular linear direction such, for example, as the vertical direction in FIG. 1. Thus light rays 13 emanating from polarizer 12 are, let us assume for example, vertically polarized. The test member 10 is of transparent stress-sensitive photoelastic material and becomes birefringent, that is, doubly refractive, under stress to a degree proportional to the stress at each point. Accordingly, at each point the plane polarized light rays 11 emanating from member 10 will be resolved into two components orthogonally related to each other, the components being directed parallel to the two principal stresses at the point, respectively. The velocity of one of these components will in general be greater than that of the other. This difference of velocity is proportional to the difference between the principal stresses. Member 14 is usually designated as an analyzer and is a second polarizer which may be identical to member 12 but is usually (but not necessarily; see text by G. H. Lee, supra, FIG. 6.6, page 161) oriented so that the direction of polarization of light passing through it is at right angles with respect to the polarization of light passing through member 12.

Assuming then that analyzer 14 passes only horizontally polarized light rays, then rays 15 will represent the horizontally polarized components, if any, of rays 11. Member 18 is a display screen. A pattern of lines, including both isochromatic fringes and isoclinic lines, will appear on screen 18, the pattern representing (by the isochromatic fringes) the state of stress distribution throughout the member 10 in terms of the difference between the principal stresses at each point and (by the isoclinic lines) the locus of points at which the principal stresses are directed parallel to the instant orthogonally related angular directions of the polarizer and analyzer. The above-described structural arrangement, less the test member 10, is well known to those skilled in the art as a plane polariscope. The theoretical considerations involved in the operation of the arrangement of FIG. 1 and their mathematical relationships are given in detail in numerous standard textbooks, as for example, in the above-mentioned text by Timoshenko and Goodier, pages 132 to 135.

The diagrammatic showing of FIG. 2 includes, in addition to all of the structural members shown in FIG. 1 and described in detail above for the corresponding designation numbers, respectively, the two substantially identical members 20 and 22 which are known in the art as "quarter-wave plates." With the addition of quarter-wave plates interposed as shown in FIG. 2, one following polarizer 12 and the other preceding analyzer 14, the overall structural arrangement of FIG. 2, less the test member 10, is well known to those skilled in the art as a circular polariscope. The circular polariscope, its associated quarter-wave plates, and the theoretical considerations and mathematical relationships involved are likewise discussed in detail in numerous prior art publications, for example, in the above-mentioned text by Timoshenko and Goodier in section 43, starting at page 135.

Functionally, the quarter-wave plates are usually introduced to eliminate the isoclinic lines from the patterns of isochromatic fringes thus facilitating study of the latter, since the plane polariscope represented diagrammatically in FIG. 1 produces patterns which include certain of the isoclinic lines. (See page 157 and section 6.6 starting at page 160 of the book by G. H. Lee, supra.)

FIG. 3 represents diagrammatically the simple modification of the arrangement of FIG. 2 required when the stress or strain distribution on a surface of an opaque member 24 is to be obtained. In this case, as mentioned hereinabove, the surface to be analyzed is coated with a layer 26 of photoelastic material and the polarized light is projected at an angle such that its reflections from the adjacent surface of member 24 can be passed through the quarter-wave plate 22 and analyzer 14 to produce a pattern on screen 18 substantially as for the arrangement of FIG. 2.

Obviously, if the quarter-wave plates 20 and 22 of FIG. 3 are removed the structure of FIG. 3 becomes equivalent to the plane polariscope represented in FIG. 1. Indeed, the conventional designs of circular polariscopes normally include movable mounting brackets for holding the quarter-wave plates so that they may be readily interposed or removed from the light path as the operator may wish.

The angles of incidence and reflection in FIG. 3 are grossly exaggerated for purposes of clarity in illustration. In actual practice they are made as nearly perpendicular to the surface of the photoelastic material as is practicable for reasons well known to those skilled in the art and explained in publications such as those mentioned hereinabove.

The above discussion is intended to present merely the basic essentials concerning the polariscopes employed in obtaining the patterns necessary for the practice of the present invention. Numerous refinements, such, for example, as appropriate optical systems for collimating and transmitting the light, the use of light filters to provide substantially monochromatic light and the like are well known and extensively used in the art and hence need not be described in this application.

It should be noted that the polarizer and analyzer can be rotated together, keeping the relation (assumed in the above-described instance to be orthogonal) between their axes of polarization unchanged (that is, keeping them "in step") without producing any change in the pattern of isochromatic fringes. The isoclinic lines will however move, the continued rotation of polarizer and analyzer "in step" resulting in the production of different isoclinic lines for each angle assumed.

The isoclinic lines at any particular "in step" angle of the polarizer and analyzer include all points on the surface at which the direction of the principal stresses are at the same "in step" angle with respect to a reference or "zero" direction on the pattern. Accordingly, to determine the direction of the principal stresses at any specific point, the quarter-wave plates of the circular polariscope are moved out of the light path (resulting in conversion to a plane polariscope) and the polarizer and analyzer are rotated "in step" until an isoclinic line passes though the specific point. The instant "in step" angle of the polarizer and analyzer then indicates the direction of the principal stresses at that point. As pointed out in the above-mentioned book by G. H. Lee in section 6.11, starting at page 179, the exploration of the model for isoclinic lines is usually most conveniently carried out with white light rather than monochromatic light. Accordingly, a change from monochromatic to white light (which can usually be effected by simply removing a filter from the light path) can well be made before exploring for isoclinic lines.

In FIG. 4 an omnidirectional pattern of isochromatic fringes for the central portions of a V-shaped test member is shown. This relatively simple shape of test member is chosen to facilitate illustration of the principles involved. It also has the advantage of presenting four surfaces of similar contour which will have substantially identical strain distributions when the member is subjected to symmetrically disposed forces. Normally, more complex members would be required to justify a resort to the "photostress" methods of analysis.

An order "$n$" (where $n$ is an integer 0, 1, 2, 3, et cetera) can be assigned to each successive fringe. A zero order fringe is, for a more or less symmetrically stressed member, usually near the center of the pattern. First order fringes ($n=1$), if any, are those next on one or both sides of a zero order fringe. Second order fringes ($n=2$) are the second fringes, if any, on one or both sides of the zero order fringe, et cetera. The fringes in FIGS. 4, 5 and 6 are numbered in accordance with their respective orders. (Reference may be had to FIG. 101 at page 138 of the text by Timoshenko and Goodier for a further specific illustrative example of fringe order numbering.)

For some stressed members there may be several zero order fringes each of which may have one or more higher order fringes adjacent it. In some instance a zero order fringe may not even appear in the pattern. Where it is not obvious, from inspection of the pattern, which are the zero order fringes, the stress on the test member may be gradually increased from zero until the first fringe or fringes appear. These will be zero order fringes. As the stress is further increased, additional fringes will appear, the order of appearance corresponding to first, second, et cetera, fringes. The original and subsequent fringes will, in general, move either toward the center or toward the periphery and even off the pattern as still further additional fringes appear with increasing stress. In general, as indicated above, the number $n$ corresponds to the order in which the fringes appear as the stress is gradually increased, the zero order fringes appearing first, the $n=1$ order fringes appearing next, et cetera. (See above-mentioned texts.)

The value of stress represented by the lowest order fringe, usually known as "the constant of proportionality," is determined by calibration of the stress-sensitive photoelastic material, for example, in the manner described in detail at page 135 of the above-mentioned text by Timoshenko and Goodier. One need only multiply the value thus obtained by the fringe order "$n$" for any point on the pattern to obtain the difference between the principal stresses at that point. For points lying intermediate successive fringes, it is usually possible to measure fractional fringes with reasonable accuracy as discussed for example at page 175 of the above-mentioned book by G. H. Lee.

In other words, the omnidirectional isochromatic fringe pattern obtained through use of a continuous coating of photoelastic stress-sensitive material enables us for any specific point on the surface (such as the point A, and in view of the symmetry of the test piece the corresponding point A') to evaluate the difference between the principal stresses in accordance with the relation $$(\sigma_u - \sigma_v) = C_1 n \quad (1)$$

where $\sigma_u$ and $\sigma_v$ are the principal stresses, that is, the stresses along and perpendicular to the isoclinic line, respectively, through the point, $C_1$ is the above-mentioned "constant of proportionality" relating stress to the photoelastic properties of the coating and $n$ is the fringe order.

Since the modulus of elasticity and Poisson's ratio for the birefringent coating are known, we can rewrite this equation in terms of the principal strains. (Conversely, if the principal strains have been obtained, the principal stresses can obviously be derived from them.)

$$(\epsilon_u - \epsilon_v) = C_2 n \quad (2)$$

where $\epsilon_u$ and $\epsilon_v$ are the principal strains and $C_2$ is the "constant of proportionality" relating strain to the photoelastic properties of the coating.

Since the directions of the principal strains (and stresses) change from point to point on the surface, it is advantageous to transform the equation to a fixed coordinate system $x$—$y$, where, for example, the $x$ axis is horizontal and the $y$ axis is vertical, as for the polarizations of analyzer 14 and polarizer 12, respecitvely, of FIG. 1, and the horizontal and vertical arms of the test member of FIGS. 4 through 8, inclusive. Now $$(\epsilon_x - \epsilon_y) = (\epsilon_u - \epsilon_v) \cos 2\theta \quad (3)$$

where $\theta$ is the angle of the isoclinic with respect to the $y$ axis at the point being considered. By way of example, FIG. 7 shows the 45 degree isoclinic lines for the member for which FIG. 4 gives an isochromatic fringe pattern. From Equations 2 and 3

$$(\epsilon_x - \epsilon_y) = C_2 n \cos 2\theta \quad (4)$$

Therefore the difference between the strains on the fixed coordinate system $(x,y)$ are known from the fringe value, $n$, and the isoclinic at each point.

A second experiment is now performed which uses photoelastic strips as indicated by the fine lines shown in FIG. 5 instead of the continuous photoelastic coating as was used in FIG. 4. These strips are much more stress or strain sensitive, as has been discussed at length above, along their longer axis (as shown in FIG. 5, it is along the horizontal axis designated as the $x$ axis) than in the transverse direction. These strips are not only substantially insensitive to transverse strain as discussed at length above but are also substantially insensitive to a shear strain $\gamma_{xy}$ and from the observed birefringence (that is, as indicated by the isochromatic fringe pattern) of these strips we have an equation of the form $$(\epsilon_x - \alpha \epsilon_y) = C_3 n \quad (5)$$

where $\alpha$ is the ratio of transverse sensitivity to longitudinal sensitivity and $C_3$ is the appropriate "constant of proportionality" for the strip material. Strips have been made in which $\alpha$ is sensibly zero (indicating extremely small, that is, practically negligible, transverse sensitivity). Then Equation 5 becomes simply $$\epsilon_x = C_3 n \quad (6)$$

The combined results from the standard birefringent coating (Equation 4) and isoclinic line direction through each point and the strip-type coating (Equation 5 or 6) are, as indicated hereinabove, sufficient to determine the unique strains and their respective directions at all points on the surface of the structure.

The above describes the first method, procedure and arrangement of the invention mentioned hereinabove.

*Second method*

The isochromatic patterns of FIGS. 5 and 6 may be employed in combination in a second method, procedure and arrangement of the invention.

It should be noted that since the test member to which the patterns of FIGS. 4 through 7 correspond has two arms oriented at 90 degrees with respect to each other and in FIG. 5 the strips are applied, as indicated by the fine lines, to both arms with their axes parallel to the $x$ axis (that is, horizontal) and further, since the member is symmetrical about an axis of symmetry (S—S of FIG. 8) and is stressed by forces (F, F' of FIG. 8) also symmetrically arranged about the axis of symmetry, the single pattern of FIG. 5 will serve to illustrate, by its two like arms symmetrically loaded, the application of the strip-type mat or matrix of photoelastic material at two orientations making an angle of 90 degrees with respect to each other.

The symmetry of the member is further illustrated in FIG. 6 where the photoelastic strip-type mat or matrix is applied with the longitudinal axes of its strips at an angle of 45 degrees with respect to the longitudinal axes of both arms, as indicated by the fine lines. Accordingly, the isochromatic pattern of either arm of FIG. 6 from near its free end to the axis of symmetry S—S may be employed with the patterns of the two arms of FIG. 5 in the second method of the invention.

Considering the diagram of FIG. 8, it will be assumed that the strain at point A on the right arm is to be determined. Because of the symmetry of the structure and the symmetry of the applied forces, F, F', it should be noted that the corresponding point A' on the left arm will be subjected to identical stress or strain.

From the unidirectional isochromatic fringe patterns of FIGS. 5 and 6, at point A (and its corresponding point A') the following fringe order values are obtained: Fringe order for strips parallel to $a$—$a$ axis, $n=+0.15$; Fringe order for strips parallel to $b$—$b$ axis, $n=-1.05$; Fringe order for strips parallel to $c$—$c$ axis, $n=-0.05$.

By calibration in the manner described hereinabove, it has been determined that for the photoelastic strips employed to obtain the fringe patterns of FIGS. 5 and 6 one fringe represents a strain of $500 \times 10^{-6}$ inches per inch.

Thus the strains at point A along the axes $a$—$a$, $b$—$b$ and $c$—$c$ are $+75 \times 10^{-6}$ inches per inch, $-525 \times 10^{-6}$ inches per inch and $-25 \times 10^{-6}$ inches per inch, respectively. This data is, of course, sufficient to determine the complete state of strain at the selected point A.

If Young's modulus and Poisson's ratio for the material are known (as they are for all materials normally employed in structural arrangements), the complete state of stress at point A may be determined from well known elasticity equations. For example, see equation 2.18 at page 54 of the above-mentioned book by G. H. Lee. Assuming that the material of the test member of FIGS. 4 through 8, inclusive, is aluminum having values of Young's modulus $E = 10 \times 10^6$ pounds per square inch and Poisson's ratio $\sigma = \frac{1}{3}$, respectively, the principal stresses $\sigma_1$ and $\sigma_2$ are $+4535$ pounds per square inch and $-3785$ pounds per square inch, respectively, where the positive sign indicates tension and the negative sign indicates compression.

A check by the "first method" described hereinabove gives a value of $+4500$ pounds per square inch for $\sigma_1$ which differs by less than one percent from the value of $+4535$ pounds per square inch obtained by the "second method."

Numerous and varied modifications, rearrangements and adaptations of the above-described methods, procedures and structures will readily occur to those skilled in the art fully within the spirit and scope of the principles of the present invention as disclosed in this application. It should be particularly noted that the methods and structures of the invention are, as pointed out in detail hereinabove, applicable to any type of test member having at least one surface subject to stresses or strains of various amplitudes and directions, the surface being accessible for the application of stress-sensitive photoelastic material and the reflection of light from said surface. No attempt to exhaustively illustrate all such possibilities has been made.

What is claimed is:

1. An article of manufacture for use in photoelastic methods of stress and strain analysis which comprises a matrix or mat formed of a large number of like, closely spaced, elongated strips of photoelastically strain-sensitive material assembled in parallel relation and supported on a layer of a material having negligible photoelastic sensitivity to strain, adjacent strips being substantially mechanically independent of each other, the width of each strip in the plane of the surface of the matrix or mat being a small fractional part of its length.

2. A method of analyzing the stress and strain distribution over a surface of a member when the member is subjected to prescribed forces which produce strains having wide variations in amplitude and direction over the surface, comprising coating the unstrained surface with a first layer of uniformly thick continuous photoelastic strain-sensitive material, subjecting the member to the prescribed forces, passing linearly polarized light through the layer, receiving reflections of the light from the surface, passing the reflected light through an analyzer to form an omnidirectional pattern of isochromatic fringes, recording the pattern, producing patterns of isoclinic lines for a plurality of directions across the surface respectively, recording the patterns of isoclinic lines, removing the prescribed forces from the member, removing the first layer of photoelastic material, applying to the surface a second layer of photoelastic material similar to the first layer but comprising essentially a plurality of like, elongated, parallel, closely spaced, but mechanically substantially independent, strips of the strain-sensitive photoelastic material, the width of each strip being a small fractional part of its length, again subjecting the member to the prescribed forces, passing linearly polarized light through the second layer, receiving reflections of light from the surface and passing the reflected light through an analyzer to form a unidirectional pattern of isochromatic fringes and recording the last mentioned pattern, whereby the unique values of the principal strains at each point on the surface may be obtained from the combined information afforded by said recorded patterns.

3. The method of ascertaining the distribution of stress and strain over a surface of a member when the member is subjected to prescribed forces which produce strains having wide variations in amplitude and direction over the surface, comprising applying to the surface, while in an unstressed condition, a first layer of strain-sensitive photoelastic material formed from a plurality of like, elongated, closely spaced, but mechanically substantially independent, parallel strips of the photoelastic material, the width of each strip being a small fractional part of its length, applying the prescribed forces to the member, passing linearly polarized light through the layer, receiving reflections of the light from the surface of the member, passing the reflected light through an analyzer to form a pattern of unidirectional isochromatic fringes, recording the pattern, removing the applied forces from the member, removing the first layer of photoelastic material, repeating the above-described process successively with second and third layers of photoelastic material of identical type with said first layer but with the longitudinal axes of the strips of the second layer being applied to the surface in a direction at right angles to the direction of the strips of the first layer and the longitudinal axes of the strip of the third layer being applied to the surface in a direction at an angle of 45 degrees to the directions of the strips of the first and second layers, whereby the stress and strain at each point on the surface may be ascertained from combined use of the three unidirectional isochromatic fringe patterns.

4. The method of claim 2 in which the member has two like surfaces subjected to substantially identical strain distributions, the first and second layers of photoelastic material are applied to said two surfaces, respectively, while the member is in an unstressed condition and the member is thereafter subjected to the prescribed forces.

5. The method of claim 3 in which the member has three like surfaces subjected to substantially identical strain distributions, the first, second and third strip-type layers of photoelastic material are applied to said three surfaces, respectively, while the member is in an unstressed condition and the member is thereafter subjected to the prescribed forces.

6. An article of manufacture for use in strain indicating means comprising a plurality of like, elongated strips of strain-sensitive photoelastic material assembled in parallel, closely spaced, substantially mechanically independent relation, the width of the individual strips being a small fraction of their length.

7. The method of ascertaining the distribution of strain over a surface of a member when the member is subjected to prescribed forces which produce strains having wide variations in amplitude and direction over the surface, comprising applying to the surface while in an unstressed condition a first layer of photoelastic material formed from a plurality of like, elongated, closely spaced, but mechanically substantially independent, parallel strips of photoelastic material, the width of each strip being a small fractional part of its length, applying the prescribed forces to the member, passing linearly polarized light through the layer, receiving reflections of the light from the surface of the member, passing the reflected light through an analyzer to form a pattern of undirectional isochromatic fringes, recording the pattern, removing the applied forces from the member, removing the first layer of photoelastic material, repeating the above-described process successively with second and third layers of photoelastic material of identical type with said first layer but with the longitudinal axes of the strips of the second layer being directed in a first prescribed direction with respect to the direction in which the axes of the strips of the first layer were applied and with the longitudinal axes of the strips of the third layer being directed in a second prescribed direction with respect to the direction in which the axes of the strips of the first layer were applied, the relative directions of the strips of the three layers being mutually interrelated to provide three patterns of unidirectional isochromatic fringes affording in combination sufficient information from which the principal strains at each point on the surface can be uniquely determined.

References Cited by the Examiner

UNITED STATES PATENTS

| 1,711,347 | 4/29 | Harter | 73—88 |
| 2,318,102 | 5/43 | Ruge | 338—2 |

FOREIGN PATENTS 771,074   3/57   Great Britain.

RICHARD C. QUEISSER, *Primary Examiner.*

DAVID SCHONBERG, *Examiner.*